US008878646B2

(12) United States Patent
Chutorash et al.

(10) Patent No.: US 8,878,646 B2
(45) Date of Patent: Nov. 4, 2014

(54) COMMUNICATION SYSTEM AND METHOD

(75) Inventors: Richard J. Chutorash, Rochester Hills, MI (US); James E. Trainor, Holland, MI (US); Jeffrey Golden, Holland, MI (US); Steven L. Geerlings, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 256 days.

(21) Appl. No.: 13/123,554

(22) PCT Filed: Oct. 13, 2009

(86) PCT No.: PCT/US2009/060467

§ 371 (c)(1), (2), (4) Date: Jun. 28, 2011

(87) PCT Pub. No.: WO2010/045208

PCT Pub. Date: Apr. 22, 2010

(65) Prior Publication Data

US 2011/0250845 A1 Oct. 13, 2011

Related U.S. Application Data

(60) Provisional application No. 61/104,839, filed on Oct. 13, 2008.

(51) Int. Cl.

| | |
|---|---|
| ***B60R 25/00*** | (2013.01) |
| ***B60Q 1/48*** | (2006.01) |
| ***G08B 13/08*** | (2006.01) |
| ***G08C 17/00*** | (2006.01) |

(52) U.S. Cl.

CPC .................................... *G08C 17/00* (2013.01)

USPC .................... 340/5.71; 340/932.2; 340/545.1

(58) Field of Classification Search

CPC .......... G07C 2009/00928; G07C 2009/00865; G08B 13/08

USPC ................................. 340/5.71, 932.2, 545.1

See application file for complete search history.

(56) References Cited

U.S. PATENT DOCUMENTS

| | | | | |
|---|---|---|---|---|
| 6,091,330 | A * | 7/2000 | Swan et al. | 340/539.1 |
| 6,271,765 | B1 * | 8/2001 | King et al. | 340/12.22 |
| 6,429,773 | B1 | 8/2002 | Schuyler | |
| 6,448,894 | B1 * | 9/2002 | Desai | 340/505 |
| 6,563,431 | B1 * | 5/2003 | Miller, Jr. | 340/932.2 |
| 7,049,980 | B1 * | 5/2006 | Chemelewski | 340/932.2 |
| 7,161,498 | B1 * | 1/2007 | Fan | 340/932.2 |

(Continued)

FOREIGN PATENT DOCUMENTS

EP 0955219 A2 11/1999

*Primary Examiner* — George Bugg

*Assistant Examiner* — Munear Akki

(74) *Attorney, Agent, or Firm* — Foley & Lardner LLP; Scott P. Ryan

(57) ABSTRACT

A communication system and method in which the communication system comprises a first communication module (11) and a second communication module (12). The first communication module (11) is located inside a vehicle (1), and the second communication module (12) is located in a garage door opener (3) and/or a home (2). A first information (11) relating to status information of the vehicle (1) is transmitted wirelessly between the first and second communication modules (11, 12). Additionally or alternatively, a second information is transmitted between the first and second communication modules (11, 12). The second information relates to status information of the garage door opener (3) and/or the home (2).

4 Claims, 1 Drawing Sheet

(56) References Cited

U.S. PATENT DOCUMENTS

| | | | | |
|---|---|---|---|---|
| 7,986,299 | B2 * | 7/2011 | Ota et al. | 345/156 |
| 8,193,901 | B2 * | 6/2012 | Ota et al. | 340/3.71 |
| 2002/0140555 | A1 * | 10/2002 | Jette et al. | 340/540 |
| 2003/0043021 | A1 * | 3/2003 | Chung | 340/5.71 |
| 2005/0035855 | A1 * | 2/2005 | Sarnowsky | 340/531 |
| 2005/0068196 | A1 * | 3/2005 | Marin | 340/932.2 |
| 2005/0170777 | A1 * | 8/2005 | Harwood et al. | 455/41.2 |
| 2005/0280529 | A1 * | 12/2005 | Hinkson et al. | 340/539.1 |
| 2006/0158344 | A1 * | 7/2006 | Bambini et al. | 340/825.69 |
| 2007/0167138 | A1 * | 7/2007 | Bauman et al. | 455/41.2 |
| 2008/0055058 | A1 | 3/2008 | Nishiyama | |
| 2009/0143935 | A1 * | 6/2009 | Hsu | 701/33 |
| 2009/0146843 | A1 * | 6/2009 | Dobson | 340/932.2 |
| 2009/0289813 | A1 * | 11/2009 | Kwiecinski et al. | 340/932.2 |
| 2010/0271193 | A1 * | 10/2010 | Gonzaga | 340/457 |
| 2010/0305779 | A1 * | 12/2010 | Hassan et al. | 701/2 |

* cited by examiner

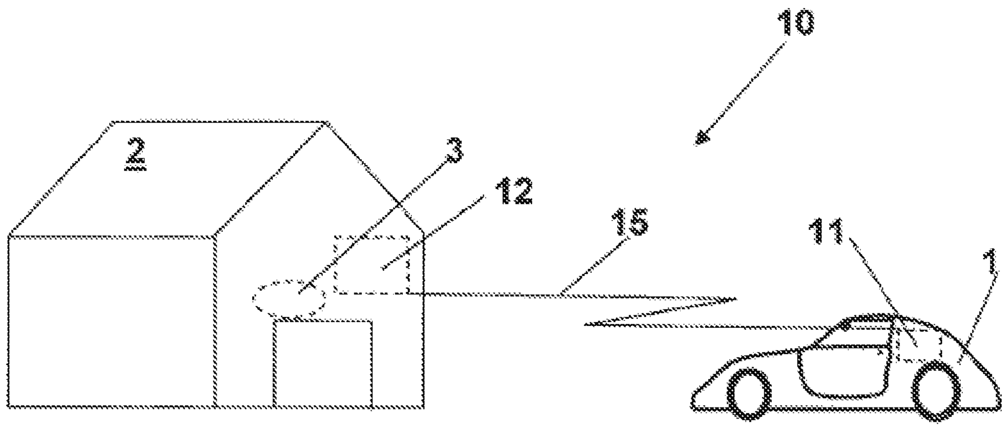
10
2
3
12
15
11
1

COMMUNICATION SYSTEM AND METHOD

CROSS REFERENCE TO RELATED APPLICATION

The present application claims the benefit of PCT International Application No. PCT/US2009/060467 filed Oct. 13, 2009, entitled "Communication System And Method" and U.S. Provisional Application Ser. No. 61/104,839 filed Oct. 13, 2008, entitled "Vehicle/GDO 2-Way Communication Use Case Scenarios", and the disclosures of these applications are incorporated herein by reference in their entirety.

BACKGROUND OF THE INVENTION

Field Of The Invention

The present invention relates to a method that allows 1-way, or preferably 2-way, communication (unidirectional or bidirectional communication) between a first communication module within a vehicle and a second communication module within, for example, a Garage Door Opener (GDO) and/or a home. The present invention also relates to a vehicle and a home-system for allowing such communication and to a GDO that comprises means for 1-way, or preferably 2-way, communication between a vehicle and the GDO, and/or the GDO and a home.

SUMMARY OF THE INVENTION

Safety is becoming an increasingly important issue, and therefore, methods and systems for improving safety are desirable. The system of the present invention includes a first communication module and a second communication module for communicating with one another. The first communication module is preferably located inside a vehicle, and the second communication module is preferably located in a Garage Door Opener (GDO) and/or a home. A first information relating to status information of the vehicle is transmitted between the first and second communication modules. Alternatively or additionally, a second information relating to status information of the GDO and/or the home is transmitted between the first and second communication modules.

The method of the present invention includes a first communication module located inside a vehicle and a second communication module located in a GDO and/or a home. The method comprises the step of transmitting a first information relating to status information of the vehicle between the first and second communication modules. Alternatively or additionally, the method comprises the step of transmitting a second information relating to status information of the GDO and/or the home between the first and second communication modules. The inventive method allows 1-way, or preferably 2-way, communication between a vehicle, a GDO and/or a home and vice versa.

BRIEF DESCRIPTION OF THE DRAWING

FIG. 1 schematically illustrates an inventive communication system comprising the first communication module and the second communication module.

DETAILED DESCRIPTION OF THE EXEMPLARY EMBODIMENT

In FIG. 1, a communication system 10 according to the present invention is schematically shown. The communication system 10 comprises a first communication module 11 and a second communication module 12. The first and second communication modules 11, 12 communicate with one another by means of a wireless communication interface 15 or a wireless communication link 15. The wireless communication interface 15 of the communication system 10 may comprise HomeLink™ technology, which is a product of Johnson controls, Inc. However, it should be appreciated that other wireless systems could alternatively be used. The communication between the first module 11 and the second module 12 is either performed in an unidirectional manner or in a bidirectional manner. A bidirectional communication between the first and second communication modules 11, 12 is preferred.

The first communication module 11 is preferably located inside a vehicle 1. The second communication module 12 is preferably located in or assigned to a Garage Door Opener 3 (hereinafter also designated by GDO). Alternatively or additionally, the second communication module 12 could be located in or assigned to a home 2. The home 2 could be any house, apartment, office or the like. The GDO and/or the home 2 could be connected to the second communication module 12 wirelessly and/or by a landline (wire-bound).

Due to the 1-way, or preferably 2-way, communication, it is possible to exchange information and/or commands between the vehicle 1, the GDO 3 and/or the home 3 by means of the inventive communication system and vice versa. The communication between the vehicle 1 and the GDO/home 2, 3 is preferably a wireless communication over the communication link 15. The communication between the GDO 3 and the home 2 can be provided wirelessly and/or by a landline (wire bound).

The GDO 3 according to the present invention is any means to open a garage door and/or a gate. For example, one possible GDO 3 is the commercially available Chamberlain GOD system. The 1-way, or preferably 2-way, communication can be deployed within the HomeLink™ system using the 1-way, or preferably 2-way, communication of the Chamberlain GDO systems. However, it should be appreciated that any other garage door opener or any other barrier system could be employed.

The vehicle 1 could be any vehicle known to a person skilled in the art. The vehicle 1 comprises means (e.g. the first communication module 12) that allow the 1-way, or preferably 2-way, communication with the GOD 3 and/or the home 2 system. The vehicle 1 preferably includes a global positioning system (GPS) or another location sensing means.

In one embodiment, a first information, or a vehicle status information, is communicated from the first communication module 11 of the vehicle 1 to the second communication module 12 of the GDO 3 and/or home 2 systems. The vehicle 1 knows its location through the GPS or other location sensing means and preferably communicates the first information to the GDO 3 and/or home 2 system as the vehicle 1 approaches the home 2 or gate barrier. Alternatively, the vehicle 1 could communicate the first information to the GDO 3 and/or home 2 upon activation of the GDO 3 from the vehicle 1. The first information could include tire pressure; exterior, interior or engine temperature; battery health or battery charge level; electric vehicle (EV) or plug-in hybrid electric vehicle (PHEV) charging status; door lock status; window position status; headlight status; vehicle heading, e.g. the vehicle being pulled into the garage forwardly or the vehicle being backed into the garage; oil level, oil quality or the time/mileage until the next oil change; odometer reading; GPS/location data; and diagnostics information. The preferred first information sent from the vehicle 1 to the GDO 3 and/or home 2 are listed as follows:

Tire Pressure
Vehicle Temp—Exterior, Interior, Engine
Fuel
Battery—Health, State of Charge
EV/PHEV charging status
Doors Locked
Windows Up
Headlights on
Vehicle 'Heading' (pulled in/backed in)
Oil—Level, Quality, Time/Mileage to Change
Odometer
Washer Fluid
GPS/Location Data
Diagnostics In another exemplary embodiment, the GDO 3 has a second information such as status information that can be communicated to the vehicle 1. Specifically, the GDO 3 has a second information, such as status information, that is useful to be communicated to the home 2 network systems. The second information could include garage door status (e.g. open, opening, closed, closing, diagnostics, etc.), light status (e.g. on, off or operating), safety photocell beam status (e.g. interrupted or fault), power line interruption status (e.g. length of interruption, brown out), garage intruder sensor status, information from a vehicle-in position sensor, information from a sound monitoring sensor, information from a magnetic sensor, information from an atomic clock, information from an ambient light sensor, information from a temperature sensor, information from a motion detection sensor or information from a camera. The second information of the GDO 3 preferably includes information from one or any combination of two and more sensors listed below:

Door Status Open, Opening, Closed, Closing, Diagnostics, etc.
Light Status On/Off, Operating
Safety Photocell Beam Interrupted/Fault
Power Line (120V) Interruption, Length of Interruption, Brown Out
Garage Intruder sensor status
Vehicle in position sensor
Sound monitoring sensor
Magnetic sensor
Atomic Clock
Ambient Light sensor
Temperature sensor
Motion Detection
Camera In still another exemplary embodiment, the home 2 has a second information such as home status information that can be communicated to the vehicle 1 and/or to the GDO 3. Preferably, the home status information is communicated to the vehicle 1 and to the GDO 3. The home network status could include security information; heating, ventilating and air conditioning (HVAC) information; settings information; power failure information; sprinkler system status or settings information; and rain sensor information. The second information of the home 2 preferably includes information from one or more of the following:

Security
Heating, Ventilating and Air Conditioning
Settings
Power Fail
Sprinkler Status/Settings
Rain Sensor Preferably, the GDO 3 communicates with the home lighting system to turn garage light on. More preferably, when the GDO 3 is activated by the vehicle 1 or by the home 2 network.

These lights could be 'timed' to turn on/off with the GDO 3 lights or some other time interval.

Preferably, the vehicle 1 comprises a remote start function/system. If the vehicle 1 senses that it is within a garage (and/or if the GDO 3 transmits the information that the GDO 3 is currently opened, closed, opening, closing, etc.), then the vehicle 1 sends the appropriate communication to the GDO 3 prior to starting the vehicle 1 from a remote command to assure that the garage door is open prior to starting the vehicle 1. Also, the vehicle system preferably assures that the vehicle 1 is secure for anti-thief. The remote start system follows the following steps: assure that the vehicle 1 is in the garage, open the garage door (if necessary), assure that the garage door is opened, start the vehicle 1 and optionally secure the vehicle 1 (e.g., lock the doors, roll up the windows and arm the alarm system). Specifically, these steps are listed as follows:

Vehicle in Garage
Garage door open/closed
Assure door open
Start vehicle
Secure Vehicle (Lock, Windows, Armed)

When the vehicle 1 senses through the location sensing means described above that it is not in the proper position to have the door close without harm to property or life, a communication is sent from the vehicle 1 to the GDO 3 to 'force' the GDO 3 into the open position. This 'automatic reverse request' system can only force the GDO 3 'up', or open, and it only occurs when the vehicle location and obstruction are known. These elements are listed below:

Up-only command
GPS/Location vehicle known
Obstruction known

Additionally, the vehicle 1 preferably receives a communication from the GDO 3 that the garage door is opening or closing. The vehicle 1 is then able to compare its location to the garage door and warn the driver not to enter the garage if the garage door is closed or closing.

Preferably, the GDO 3 provides cycle information including when, how often and/or by whom the garage door has been opened in the past. The GDO 3 preferably stores and/or communicates cycle information to the vehicle 1 and/or the home 2 network. The GDO 3 cycle counter preferably includes information such as the date, the time since departure, a time/date stamp (e.g. with an atomic clock) and the amount of daylight. These elements are listed as follows:

To date
Since departure
Time/Date stamp (atomic clock)
Daylight/darkness

Preferably, the clock inside the GDO 3, the clock inside the home 2 and the clock inside the vehicle 1 all synchronize with one another.

Proper positioning of the vehicle 1 within the garage is desirable. Through the use of sensors and the 2-way communication between the GDO 3 and vehicle 1, a process is preferably developed to notify the driver that the vehicle 1 is positioned well within the garage. The GDO 3, therefore, preferably comprises and/or is connected to a sensor that senses the position and/or velocity of the vehicle 1 when the vehicle 1 is in or close to the garage. The sensors could also include a GPS or compass sensor; a beam broken sensor; and a vehicle speed sensor. The preferred sensors are listed as follows:

GPS/Compass
Beam Broken
Vehicle Speed

Preferably, the garage interior lights are sensed by the GDO 3 and their status is communicated to the vehicle 1 and/or home 2 network. Based on the signal of the sensor appropriate actions are preferably initiated. GDO 3, vehicle 1 or home 2 could turn on the garage ceiling, or interior, lights as a function of an ambient light sensor and/or an atomic clock reading. In other words, the lights could be turned on in response to the garage being dark or in response to it being past a predetermined time. The factors for turning on the lights are listed as follows:

GDO ambient light sensor

Atomic clock reading

By means of the 1-way, or preferably 2-way, communication between the GDO 3 and the vehicle 1, data (e.g. files) are preferably communicated or exchanged that are preferably not associated with GDO 3 or the vehicle 1 functioning.

In another exemplary embodiment, a command from the vehicle 1 is communicated to turn the GDO 3 lights on, preferably without actuating the GDO 3. In other words, the vehicle 1 can turn on the garage lights without opening or closing the garage door.

In another exemplary embodiment, the GDO 3 comprises a learn functionality. Specifically, a 'learn' button for the GDO 3 can be placed within the vehicle 1 to improve the training process of the vehicle 1 to a particular GDO 3. The 2-way communication between the GDO 3 and vehicle 1 would facilitate this utility.

Preferably, the GDO 3 can be placed in a 'vacation' mode, which locks the GDO 3 from activation from remote transmitters. This function/command is preferably communicated to the GDO 3 from the vehicle 1.

As a vehicle 1 'approaches' a GDO 3 the GPS/location information could be communicated from the vehicle 1 to the GDO 3. This could be useful to prepare the GDO 3 to activate (wake up) or notify individuals within the garage that a vehicle 1 is approaching. Among other actions, the GDO 3 could turn the lights on or play a sound notification in response to a vehicle 1 approaching.

Preferably, a sensor is placed with the garage. That sensor could be connected to the GDO 3 and/or the home 2 system and could sense garage intrusion (particularly if the garage is closed). If a garage intrusion is detected, the GDO 3 could communicate this status to the vehicle 1 as the vehicle 1 approaches the GDO 3 or upon vehicle 1 activating the GDO 3. This information could be communicated to the vehicle driver by the vehicle 1. The sensors could include a motion detect sensor, a fixed kit camera sensor or even the vehicle's alarm system. The preferred sensors are listed as follows:

Motion Detect

Fixed Kit Camera

Utilize Vehicle Alarm

The foregoing invention has been described in accordance with the relevant legal standards, thus the description is exemplary rather than limiting in nature. Variations and modifications to the disclosed embodiment may become apparent to those skilled in the art and fall within the scope of the invention.

The invention claimed is:

1. A method of electronically assisting a driver with positioning a vehicle within a garage using communication between a vehicle control system and a garage door opener comprising:

receiving, at a vehicle sensor interface, a first positioning information from a vehicle sensor;

receiving, using a vehicle communication module, a second positioning information from the garage door opener;

determining, using a vehicle processor and based on the first positioning information and the second positing information, whether the vehicle is positioned within the garage;

using the vehicle processor to notify an occupant of the vehicle that the vehicle is positioned within the garage;

determining, using the vehicle processor and based on the first positioning information and the second positioning information, that the vehicle is positioned such that the garage door will come into contact with an obstructing object while closing; and sending, using the vehicle communication module, an open instruction to the garage door opener which forces the garage door opener to open a garage door.

2. The method of claim 1, wherein the vehicle sensor is at least one of a global positioning system receiver, a compass, and a vehicle speedometer, and wherein the second positioning information includes a safety photocell status which indicates whether a safety photocell beam has been interrupted.

3. The method of claim 1, further comprising:

determining a location of the vehicle using the vehicle processor and the first positioning information from the vehicle sensor;

transmitting the first positioning information to the garage door opener, using the vehicle communication module, as the vehicle approaches the garage;

receiving the first positioning information using a garage door opener communication module;

generating a notification using the garage door opener indicating that the vehicle is approaching the garage.

4. The method of claim 3, wherein generating a notification using the garage door opener indicating that the vehicle is approaching the garage includes at least one of turning on a light and playing a sound.

* * * * *